Patented Sept. 15, 1925.

1,553,556

UNITED STATES PATENT OFFICE.

ALLEN ROGERS, OF BROOKLYN, NEW YORK, ASSIGNOR TO MIMO CORPORATION, OF NEW YORK, N. Y., A CORPORATION OF DELAWARE.

SYMPATHETIC INK.

No Drawing.   Application filed September 20, 1923.   Serial No. 663,901.

*To all whom it may concern:*

Be it known that I, ALLEN ROGERS, a citizen of the United States, residing at Brooklyn, in the county of Kings and State of New York, have invented certain new and useful Improvements in Sympathetic Inks, of which the following is a specification.

This invention relates to invisible or sympathetic inks and processes of making the same, and comprises an ink for printing on newspaper and the like with the usual forms of printing machines, consisting of a sufficiently thick vehicle to allow proper spread on the type and carrying in solution or suspension a substance which when afterwards properly treated on the paper will produce a visible effect.

Many sympathetic inks are known which can be applied in water solution or even in alcohol, but these inks will either effect the gelatin rolls of the printing machine or will not have sufficient body to spread uniformly on the type.

As it is impossible to use oil in making up a sympathetic ink, owing to the stain produced, some other medium had to be found which would carry the active substance and meet all of the other requirements. Although many substances when applied to paper are invisible and may be developed by subsequent treatment I have found that the best one for this purpose is the chemical known as phenolphthalein and in the description to follow this substance will be used. I have found, however, that cobalt chloride, ferrous ammonium sulphate, ferrous sulphate, sugar and several other substances give more or less satisfactory results.

In making up this ink I dissolve the phenolphthalein in alcohol and to obviate any risk from fire I add a certain amount of carbon tetrachloride. Other non-inflammable substances can also be used, but on account of the cost I prefer the carbon tetrachloride. The solution when prepared as above may be used for printing, but owing to rapid evaporation does not give satisfactory results. This difficuty may be offset by dissolving in the mixture a certain amount of water—white rosin and chip soap the proportions of which will be given later. This thickening mixture, however, can only be used with organic substances and is not applicable when cobalt or other metallic salts are used. To cover all cases I find that the most satisfactory thickening agent is glycerine, and by its use any degree of thickness may be secured. When glycerine is added to the alcohol and carbon tetrachloride solution it does not mix readily and so it becomes necessary to add some other substance which will produce a uniform product. I have found that by adding a small quantity of acetone the glycerine will then dissolve readily and the resulting solution is uniform. Acetone in itself is inflammable, but the presence of the carbon tetrachloride will overcome the fire hazard.

Although various proportions of the compounds may be mixed to produce a sympathetic ink I have found the following to give the best results: phenolphthalein 1 part, alcohol 3 parts, carbon tetrachloride 2 parts, acetone 3 parts, glycerine 16 parts. This ink may be developed by an alkali applied on a cloth to the surface of the paper, e. g. a solution of washing soda and water.

Having thus fully described my said invention, what I claim as new and desire to secure by Letters Patent, is:

1. A sympathetic ink comprising alcohol, phenolphthalein, carbon tetrachloride, and glycerine, substantially as set forth.

2. A sympathetic ink comprising three parts alcohol, one part phenolphthalein, two parts of carbon tetrachloride, and sixteen parts of glycerine, substantially as set forth.

3. A sympathetic ink comprising alcohol, phenolphthalein, carbon tetrachloride, glycerine, and a solution-promoting agent, substantially as set forth.

4. A sympathetic ink comprising alcohol, phenolphthalein, carbon tetrachloride, glycerine, and acetone, substantially as set forth.

5. A sympathetic ink comprising three parts alcohol, one part phenolphthalein, two parts of carbon tetrachloride, sixteen parts glycerine, and three parts of acetone, substantially as set forth.

6. A process for making a sympathetic ink which consists in dissolving phenolphthalein in a mixture of alcohol, carbon tetrachloride and acetone and to this mixture adding enough glycerine to give the desired body for printing, substantially as set forth.

7. A sympathetic ink comprising glycerine, alcohol, an anti-combustion ingredient and an ingredient normally invisible when applied to paper, substantially as set forth.

8. A sympathetic ink comprising a chemical normally invisible when applied to paper, a volatile solvent therefor, glycerine, and a solution-promoting agent, substantially as set forth.

In witness whereof, I have hereunto set my hand and seal at Brooklyn, New York, this 18th day of September, A. D. nineteen hundred and twenty-three.

ALLEN ROGERS. [L. S.]